July 5, 1932.  F. G. SEIFARTH  1,865,796
ROLLER BEARING
Filed June 30, 1928
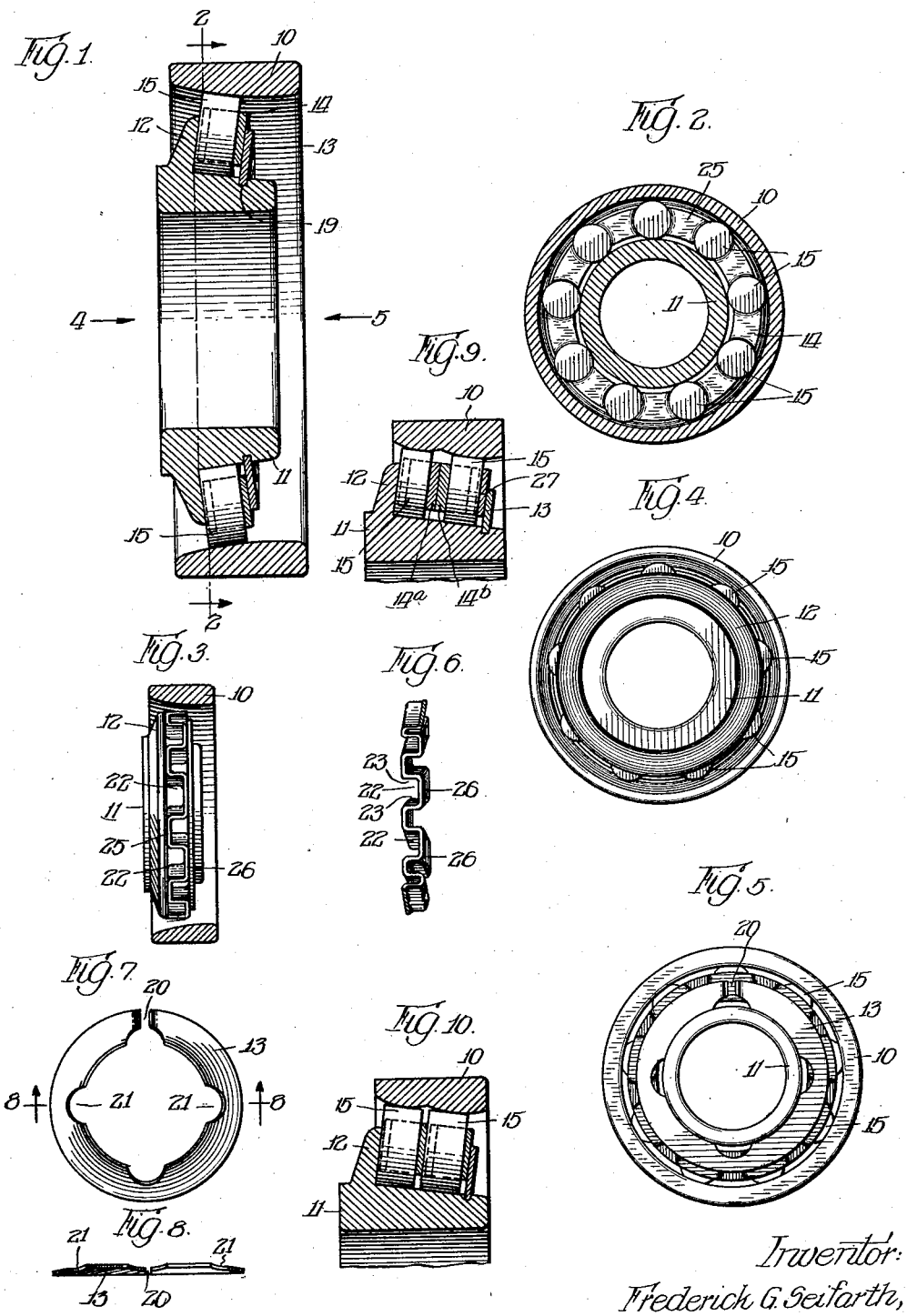
Inventor:
Frederick G. Seifarth,
By Williamson, Huxley, Byron & Knight Attys.

Patented July 5, 1932

1,865,796

UNITED STATES PATENT OFFICE

FREDERICK G. SEIFARTH, OF CHICAGO, ILLINOIS

ROLLER BEARING

Application filed June 30, 1928. Serial No. 289,358.

The present invention relates to improvements in roller bearings.

This application is a continuation in part as to common subject matter of the application Serial No. 130,621, filed August 21, 1926, by the present applicant.

The present invention relates to roller bearings for high speed service and has for one of its objects the provision of a roller bearing structure having long life under high speed conditions.

A further object is to provide a roller bearing structure of the combined radial and thrust type wherein the destructive effects of friction are reduced to a minimum.

A further object is to provide a roller bearing structure which is relatively cheap to manufacture and simple to assemble.

A further object is to provide an efficient combined thrust and radial roller bearing structure in which the heating effects under high speed service are minimized.

Further objects will appear as the description proceeds.

The present invention contemplates the use, in a combined thrust and radial bearing, of cylindrical rollers as distinguished from tapered rollers, and constitutes an improvement over the structure described and claimed in the Reissue Patent No. 15,867, granted June 24, 1924, to the present applicant.

Referring to the drawing—

Figure 1 is a sectional view illustrating one embodiment of the present invention;

Figure 2 is a sectional view taken along the planes indicated by the arrows 2—2 of Figure 1;

Figure 3 is a view similar to Figure 1 showing the roller retaining cage and retaining washer in full lines, but omitting the rollers, said rollers being omitted for purposes of clarity;

Figure 4 is a view in side elevation of the structure shown in Figure 1, said view being taken in the direction of the arrow 4 in Figure 1;

Figure 5 is a view in side elevation of the structure shown in Figure 1, said view being taken in the direction of the arrow 5 in Figure 1;

Figure 6 is a view of a roller retaining cage contemplated in the practice of the present invention, parts being broken away to show the structure;

Figures 7 and 8 are views in side elevation and in section, respectively, of a retaining washer contemplated in the practice of the present invention, the sectional view shown in Figure 8 being taken along the plane indicated by the arrows 8—8 in Figure 7;

Figure 9 is a sectional view of a modification showing a pair of sets of cylindrical rollers, the retaining cages therefor being shown back to back; and Figure 10 is a view similar to Figure 9 showing a plurality of sets of rollers and retaining cages therefor, the roller retaining face of one of said cages being presented to the back of the adjacent cage.

The numeral 10 indicates a cup, and the numeral 11 indicates the cone of a combined thrust and radial bearing. The present invention contemplates an improved structure whereby, with the use of relatively inexpensive cylindrical disk roller bearings, the friction in the roller bearing assembly between the cup 10 and the cone 11 may be reduced to a minimum. As clearly shown in the drawing, the cone 11 is provided with the shoulder 12 and the washer 13 spaced from said shoulder 12, which shoulder and washer retain between them the roller retaining cage 14 and certain rollers 15, to be referred to further hereinafter.

The washer 13 is preferably a split washer. As clearly illustrated in Figures 5 and 7, the inner periphery of said washer is adapted to seat itself within a circumferential groove 19 in the exterior surface of the cone 11. As clearly shown in Figures 5 and 7, the washer 13 is provided with a radial slit 20, by means of which said washer may be sprung into position. The washer 13 should be sufficiently wide radially so that the outer periphery of said washer is disposed outwardly of the locus of the centers of the adjacent faces of the rollers 15. In order to insure that the washer 13 may be snapped into position in the groove 19 without danger that said washer shall take a permanent set, said washer should be provided with notches spaced around the inner periphery thereof, notches suitable for the purpose being indicated by the numerals 21—21. By reason of these notches, a washer 13 may be provided having the desired width, and said washer may be sprung into position within the groove 19 without exceeding the elastic limit of the material of said washer 13.

The roller retaining cage 14 comprises a unitary member swedged or otherwise formed to provide roller retaining recesses 22—22, arranged at regular intervals throughout the periphery of said cage. As shown in Figure 6, each of the recesses 22 is defined by two opposed walls 23, which walls are of arcuate form to embrace the cylindrical surfaces of the rollers 15—15. Said rollers 15—15 are preferably of the disk type. Adjacent ends of said walls 23—23 are connected by the walls 25. The other ends of said walls 23—23 are connected by the walls 26—26 adapted to abut against the washer 13. The rollers 15—15 are of such length that when seated between the arcuate walls 23—23 in engagement with the walls 26 of the cage 14, said rollers will project a slight distance beyond the outlines of the walls 25—25. Figure 1 shows, slightly exaggerated, the manner in which the rollers project, on the high side of the bearing, beyond the adjacent boundary of the cage 14. The assembly including the cage 14 and the rollers 15 should be permitted a slight amount of play between the shoulder 12 and the washer 13. It will be noted that, by reason of the notches 21—21 in the washer 13, said washer 13 may assume a conical contour conforming to the walls 26—26 of the cage 14. The wall of the shoulder 12 adjacent to the rollers 15—15 will be conical to conform to the conical relationship between the cone 11 and the cup 10. The cage 14 will have a corresponding conical contour. The rollers 15—15 are of such diameter that they have an easy fit between the walls 23—23, whereby said rollers may twist slightly in service. It should be noted that the walls 23—23 have sufficient depth to engage the rollers 15—15 throughout a considerable portion of the thickness of said rollers, whereby to insure that said rollers will not bind. As noted in Figure 1, said rollers are engaged by the walls 23 throughout more than half of the thickness of said rollers, a preferred construction providing engagement throughout almost, though not quite, all of the thickness of said rollers.

The bearing surface of the cup 10 should be curved longitudinally of the bearing, whereby rollers 15 will contact with the bearing surface of said cup only along a circular line disposed around the inner periphery of said cup 10. The line marking the outer surface of the cone 11 in a direction longitudinally of the cone may be a straight line; that is to say, the conical surface may be described as one developed by revolution of a straight line about the axis of the cone 11. Heating effect due to the fact that the rollers have an appreciable length and therefore are adapted to have the path of travel of the rollers upon the cone 11 shaped by a circular band instead of a line, is minimized to a negligible amount by reason of the effects of centrifugal force upon said rollers, and by reason of the further fact that, as referred to above, said rollers have a certain amount of play between the walls 26 of the cage 14 and the shoulder 12 and between the walls 23—23, whereby said rollers may twist in service, approaching a line contact with the bearing surface of the cone 11. It may be explained that the twisting action referred to means a movement of the axes of the disk rollers 15 out of the plane of the axis of the cone 11.

Figure 9 illustrates a construction in which a plurality of cages are employed, said cages being arranged back to back; or, expressed in other language, arranged with the recesses 22 facing in opposite directions. Two cages 14a and 14b are shown in Figure 9. Inasmuch as said cages are disposed in cooperative relationship with cone bearings, the cage disposed toward the smaller end of the cone bearing will be smaller than the cage disposed adjacent to the larger end of said cone bearing. Of the two cages 14a and 14b, the cage 14b is the smaller and is preferably formed to provide one less roller receiving recess than is the adjacent cage 14a. By reason of this construction a large area of contact between the two cages is assured, there being no opportunity for the smaller cage to nest within the larger cage and get out of its proper position. In the construction illustrated in Figure 4, each set of rollers 15—15 is adapted to engage with a crowned bearing surface on the cup 10. A further advantage of the construction involving a difference in the number of roller receiving recesses in the two cages is that a radial load is always carried by at least three rollers, thereby distributing the load more advantageously than has been the case with prior constructions. In the construction shown in Figure 9, it is preferred to place a cupped washer 27 adjacent to the spring washer 13, said cupped washer 27 engaging the side portions of the adjacent rollers 15—15 and permitting a certain amount of play in service.

Referring now to Figure 10, a construction is illustrated in which a plurality of cages are employed, the roller receiving recesses facing in the same direction. In the construction shown in Figure 10, the rollers 15 upon the high side of the roller bearing assembly contact with the shoulder 12 and the rollers 15 on the low side of the assembly contact against the walls 26 of the next adjacent cage.

By reason of the constructions illustrated and described, assembly and disassembly of the roller bearing are very simple. The cage or cages containing the rollers 15—15 may be readily mounted upon the cone 11, the annular shoulder 12 providing a bearing surface for the rollers adjacent thereto. After the cage or cages with the rollers disposed therein are in place upon the cone 11, the spring washer 13 may be snapped into position and will assume a conical conformation, as noted above. Disassembly is accomplished with equal simplicity. By reason of the play allowed for the rollers 15, contact between the cone 11 and each set of rollers is reduced to a line contact disposed circumferentially of the cone 11. The structure shown in Figures 9 and 10 have decided advantages from both a structural and operating standpoint, inasmuch as a plurality of sets of roller bearings may be held in proper relationship with one another with a minimum of parts. It will be understood, of course, that the number of assemblies which may be used is not limited to two, but may be a greater number if desired.

It will be noted that the thrust toward the high side of the bearing assembly is borne by rollers 15 and not by the retainer carrying said rollers. Heating effects are therefore minimized.

Though certain preferred embodiments of the present invention have been described in detail, many modifications will occur to those skilled in the art. It is intended to cover all such modifications that fall within the scope of the appended claims.

What is claimed is—

1. An anti-friction bearing comprising a cone, a cup, cylindrical rollers between said cone and cup, a cage for holding said rollers in spaced relationship with one another, said cage comprising a unitary member providing recesses having arcuate side walls, said rollers being disposed in said recesses with the cylindrical surfaces thereof adjacent to said arcuate walls, abutment means for the high side of said cage and rollers, and means for limiting movement of said cage and rollers toward the low side of said bearing, said rollers and cage having play in a direction parallel with the axis of said bearing and said rollers having play between said arcuate walls.

2. In an anti-friction bearing, a cone, a cup, rollers between said cone and cup, said cone being provided with a relatively fixed abutment on its high side, a cage for holding said rollers in spaced relationship with one another, said cage comprising a fluted unitary member providing recesses for said rollers, said recesses having arcuate walls, and annular walls connecting said arcuate walls, said rollers having a sufficient thickness so that when seated within said recesses said rollers take the end thrust against said abutment means.

3. In an anti-friction bearing, a cone, a cup, rollers between said cone and cup, said cone being provided with a relatively fixed abutment on its high side, a cage for holding said rollers in spaced relationship with one another, said cage comprising a fluted unitary member providing recesses for said rollers, said recesses having arcuate walls, annular walls connecting said arcuate walls, said rollers having a sufficient thickness so that when seated within said recesses said rollers take the end thrust against said abutment means, and holding means for limiting movement of said cage in a direction toward the low side of said bearing.

4. In an anti-friction bearing, a cone, a cup, rollers between said cone and cup, said cone being provided with a relatively fixed abutment on its high side, a cage for holding said rollers in spaced relationship with one another, said cage comprising a fluted unitary member providing recesses for said rollers, said recesses having arcuate walls, annular walls connecting said arcuate walls, said rollers having a sufficient thickness so that when seated within said recesses said rollers take the end thrust against said abutment means, and holding means for limiting movement of said cage in a direction toward the low side of said bearing, said holding means comprising a washer carried by said cone and having an outer diameter at least as great as the diameter of the locus of the centers of the adjacent faces of said rollers.

5. An anti-friction bearing comprising a cone, a cup, a plurality of groups of disk rollers between said cone and cup, and a cage for each of said groups of disk rollers for holding said rollers in symmetrically spaced relationship with one another circumferentially of said cone, one of said cages having spaces for less disks than has the other of said cages.

6. An anti-friction bearing comprising a cone, a cup, a plurality of groups of disk rollers between said cone and cup, and a cage for each of said groups of disk rollers for holding said rollers in symmetrically spaced relationship with one another circumferentially of said cone, one of said cages having spaces for one less disk than has the other of said cages.

7. An anti-friction combined radial and thrust bearing comprising a cone, a cup, cylindrical disk rollers between said cone and cup, and a unitary sheet metal cage for holding said rollers in spaced relationship with one another, said cage having a plurality of pockets having side portions shaped to conform to the peripheries of said disk rollers, said side portions being sufficient in depth to engage the peripheries of said rollers throughout more than half of the thickness of said rollers.

8. An anti-friction combined radial and thrust bearing comprising a cone, a cup, cylindrical disk rollers between said cone and cup, a unitary sheet metal cage for holding said rollers in spaced relationship with one another, said cage having a plurality of pockets having side portions shaped to conform to the peripheries of said disk rollers, said side portions being sufficient in depth to engage the peripheries of said rollers throughout more than half of the thickness of said rollers, and means for holding said cage and rollers in position, said means and the walls of said pockets being disposed apart a sufficient distance to permit said disk rollers to have a twisting movement within said cage whereby to have engagement with said cone along a relatively narrow surface circumferentially of said cone.

Signed at Chicago, Illinois, this 25th day of June, 1928.

FREDERICK G. SEIFARTH.